United States Patent [19]

Harris

[11] 4,189,985
[45] Feb. 26, 1980

[54] FABRIC-LINED EPOXY RESIN CYLINDER WITH LUBRICANT RETAINING GROOVES

[75] Inventor: Bernard Harris, Bayside, Wis.

[73] Assignee: Rexnord Inc., Milwaukee, Wis.

[21] Appl. No.: 862,808

[22] Filed: Dec. 21, 1977

[51] Int. Cl.² .......................... B32B 1/08; B32B 1/10; B65H 81/06; F01B 11/00; F16L 9/16

[52] U.S. Cl. ................................. 92/153; 92/162 R; 92/170; 138/42; 156/170; 156/172; 156/173; 156/175; 277/230; 308/238; 308/240; 428/36

[58] Field of Search ............... 92/153, 162 R, 170; 138/42, DIG. 2; 156/170, 172, 173, 175; 277/230; 308/238, 240; 428/36

[56] References Cited

U.S. PATENT DOCUMENTS

| 3,441,328 | 4/1969 | Hurley et al. | 308/238 |
| 3,494,676 | 2/1970 | Compton | 308/238 |
| 3,616,000 | 10/1971 | Butzow | 156/173 |
| 3,692,375 | 9/1972 | Matt et al. | 138/144 |
| 3,804,479 | 4/1974 | Butzow et al. | 308/240 |
| 3,832,255 | 8/1974 | Shabert | 308/238 |
| 3,909,087 | 9/1975 | Cairns | 308/238 |
| 3,955,856 | 5/1976 | Wayson et al. | 308/238 |
| 4,006,051 | 2/1977 | Board | 156/175 |
| 4,107,381 | 8/1978 | Butzow | 156/173 |

Primary Examiner—J. C. Cannon

[57] ABSTRACT

A woven seamless sleeve including axial yarns forms the inner face of an epoxy resin cylinder for an air operated linear actuator. Under certain conditions, a minute, internal, spiral groove develops in applying the resin. In the operation of the actuator the groove serves to retain lubricant.

8 Claims, 9 Drawing Figures

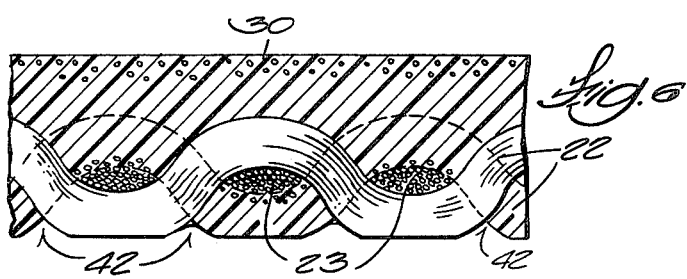
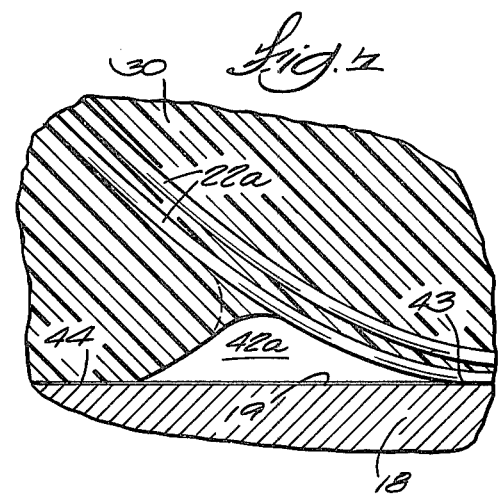
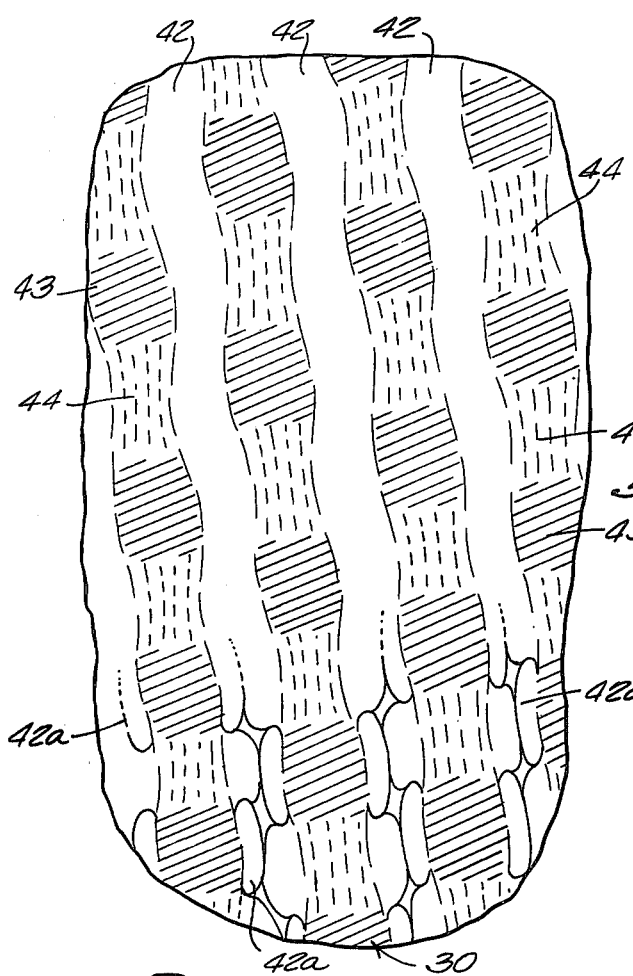
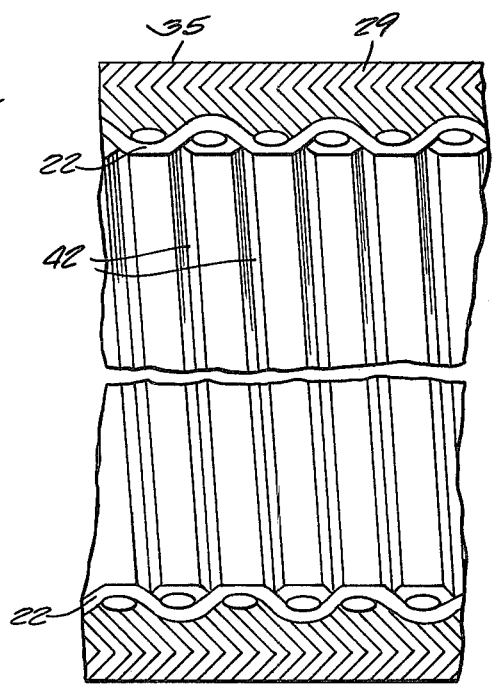
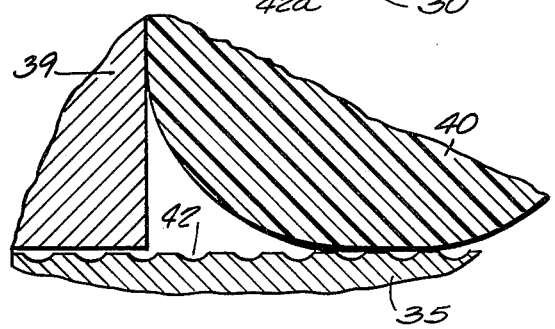

FABRIC-LINED EPOXY RESIN CYLINDER WITH LUBRICANT RETAINING GROOVES

BACKGROUND OF THE INVENTION

It is known that an air cylinder which should not be lubricated is subject to some wear on that account. However, lubricant which is sometimes unavoidably entrained in the air gathers in the asperities of the cylinder wall and will provide adequate lubrication nonetheless, provided that such asperities are adequate in number, size and depth for that purpose. That is, if the cylinder wall is ordinarily smooth, whatever lubricant is deposited is promptly instead wiped to either end of the cylinder by the piston seal ring.

It is an object of the present invention to provide the equivalent of such asperities in a glass filament reinforced epoxy resin body of an air cylinder.

U.S. Pat. No. 3,616,000 of Butzow and Harris discloses a method of making a wound glass filament reinforced epoxy resin tube with a fabric liner of low friction material exposed at the inner surface of the tube. The tube is then cut into lengthwise sections which may comprise any number of sleeve bearings. U.S. Pat. No. 3,804,479 of Butzow and Harris discloses a fabric which is particularly suitable for use as the fabric liner referred to and includes warp yarns of the polytetrafluoroethylene resin marketed under the trademark "Teflon." Bearings made in accordance with U.S. Pat. No. 3,616,000 have met with great success with various low-friction fabrics. However, a peculiarity of such bearings when made with the fabric of U.S. Pat. No. 3,804,479 and under certain conditions has been the presence of a barely visible series of closely spaced circumferential grooves in the bearing face. The certain conditions referred to obtain when the viscosity of the resin is lower than average and the filaments of the warp are more loose than might be desirable for the manufacture of such sleeve bearings.

The grooves are actually a single, spiral groove and are of such little depth that they disappear after only a moderate amount of break-in wear. Essentially they are filled by the intermediate material which is worn away and is then overlaid by the Teflon which makes such bearings self-lubricating and capable of being operated without an applied lubricant. Inspection at 40× magnification suggests that the spiral groove is formed by the capillary interaction of the resin with the yarn of the fabric liner and the non-wetting parting agent which is applied to the mandrel. It is believed that small voids develop due to such action where the yarns of the fabric curve away from the mandrel and that where these voids are sufficiently close together they tend to merge. Their locations, of course, follow the weave of the fabric and thus the voids tend to merge in lines as will be described.

It has been found that an air cylinder tube of a construction similar to that of such bearings having such a spiral groove will advantagously retain the lubricant deposited on the cylinder wall and that such a groove or grooves usefully remain intact for a significant period of service. That is, they are not promptly filled as they are in the bearings because the amount of movement of the piston over the grooves is comparably far less than that of the bearing shaft, the side loading of the piston is generally nominal or at least of a comparatively low amount, and the lubricant itself reaches the wear of the surfaces between the grooves. In fact, the entrained lubricant referred to is generally such that the lubricious effect of the Teflon filaments is only required where the side-loading of the piston against the cylinder wall may be such as 50 psi. (325 cm$^2$). Thus, the fabric lining in most instances does not require the use of the relatively expensive Teflon material.

While a spiral groove is generally formed by the merger of the voids, such a groove is not necessarily a requirement in carrying out the present invention. That is, a series of voids which have not merged to form a continuous groove should in some cases be adequate to retain the lubricant as required.

SUMMARY OF THE INVENTION

A woven seamless fabric sleeve is conformed to a cylindrical mandrel and a thermosetting resin is applied with the overlaid spiral-wound glass filaments. The assembly including the mandrel is then placed in an oven to cure and harden the resin and provide a rigid tube or cylinder having an inner dimension which corresponds with the outer dimension of the mandrel except that the epoxy resin leaves a series of voids or air-filled gaps between the resin and the mandrel. With a certain weave of the fabric and under certain conditions the adjoining voids merge and form a minute, continuous spiral groove. In an air cylinder, an adequate number of such voids or such a groove is advantageous and utilized for retaining a slight amount of lubricant. The spiral configuration is due to the seamless tubular weave in which the filling is yarn is continuous. The warp yarns may be of a low-friction material such as Tefon to provide an additional lubricating effect.

DESCRIPTION OF THE SEVERAL VIEWS OF THE DRAWINGS

FIG. 4 is an enlarged section of a cylinder of FIG. 3 and also shows the internal grooves in plan.

FIG. 5 is a further enlarged view of a portion of the cylinder wall and shows the grooves in plan.

FIG. 6 is a section of the cylinder taken in a plane normal to the grooves as shown in FIG. 5.

FIG. 7 is a very enlarged section of the cylinder and includes the adjacent section of the mandrel. The section is in a plane which is normal to the groove which is shown as it is thought to be formed in the winding step shown in FIG. 1.

FIG. 9 is an enlarged section of a portion of the piston and O-ring and shows the O-ring spanning the spiral grooves of the present invention.

Figure 1:
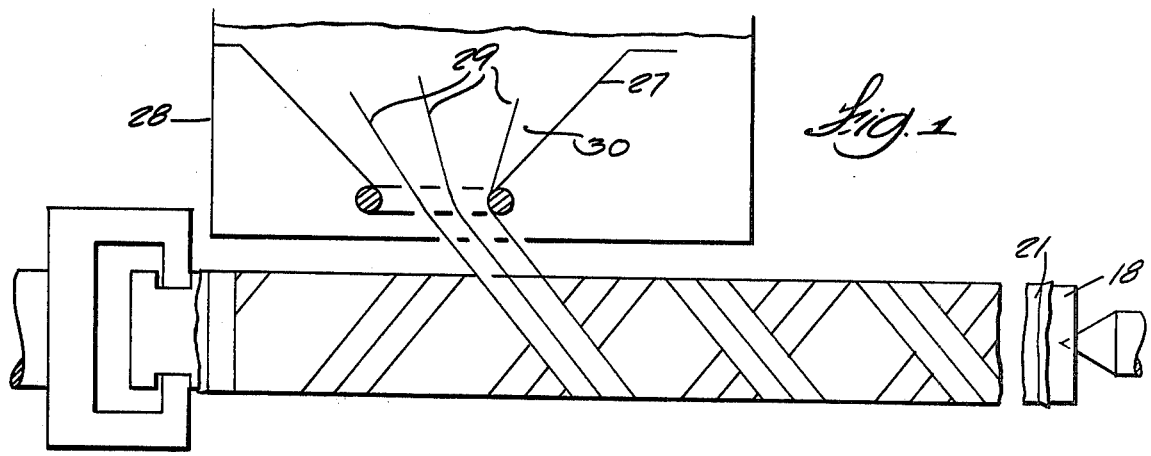
FIG. 1 shows portions of a filament winding machine and a cylindrical mandrel. A seamless fabric sleeve is conformed onto the mandrel and is secured axially by bands at its ends; the tape which comprises several of a number of resin-carrying parallel glass filament roves is being applied over the fabric in a number of layers by the reciprocation the resin-carrying funnel through which the roves pass.

DETAILED DESCRIPTION OF THE PREFERRED EMBODIMENT SHOWN IN THE DRAWINGS AND INCLUDING TYPICAL DIMENSIONS AND MATERIAL SPECIFICATIONS

The cylindrical, well finished steel mandrel 18 is two inches (50.8 cc) in diameter and four feet (1.22 m) in length and must, of course, be long enough at least for making a single cylinder as will be described. The diameter corresponds with the desired inside diameter of the finished cylinder. The four foot length of the mandrel is such as to fit a typical commercially available winding machine. The outer surface of mandrel 18 must be clean and is prepared by applying a parting agent over its entire surface. A suitable parting agent is No. DC-20 sold by the Dow-Corning Company. It is applied with a brush and then allowed to dry. A thickness of 0.0001 inches (0.00254 mm) would be typical and is considered nominal. The parting agent coating is designated in FIG. 7 of the drawings by the numberal 19. Its purpose is well known, namely to prevent the cured resin from adhering to the mandrel and facilitate endwise removal of the rigid tube from the mandrel after curing of the resin. Such parting agents function because the resin is non-wetting as to the coating 19. The coating 19 must be periodically renewed for that purpose. The non-wetting characteristic is also essential to carrying out the present invention.

The fabric sleeve 21 which is drawn over mandrel 18 with coating 19 is of a seamless, square weave construction including the lengthwise or axial warp yarns 22 and the circumferential filling yarn 23. The filling yarn should be of a size or bulk only somewhat less than that of the warp yarns. The sleeve 21 may be of one of several constructions which will be described more particularly hereinafter.

The sleeve 21 is secured endwise on mandrel 18 such as by the bands 25 applied to the sleeve ends. The sleeve 21 is also arranged so that its inner face closely conforms with the surface of the mandrel. With sleeves of certain constructions this maybe accomplished by heating the assembly and thereby heat shrinking the filling yarn 23. Heat shrinking of filling yarn 23 on the mandrel applies a uniformly distributed circumferential tension to the fabric.

Mandrel 18 as shown in FIG. 1 is supported in a winding machine which includes the funnel 27 carried by the reciprocating carriage 28. The roves 29 of glass filaments are drawn from creels, not shown, and pass through funnel 27 and are then helically wound over sleeve 21 as mandrel 18 is rotated while carriage 28 reciprocates. Only three such roves 29 are shown for clarity; twenty-two roves would be typical and closely spaced to form a "tape."

Funnel 27 carries a supply of thermosetting epoxy resin 30 which adheres to the tape and is applied simultaneously therewith to sleeve 21. (The tape passes a stopper, not shown, in the bottom opening of funnel 27; this stopper retains the remaining resin.) A tension of between 2 to 4 pounds (0.91 to 1.81 kg) is applied to the tape by conventional means, not shown, as it winds around the sleeve. The tension of the tape is critical to the present invention.

Figure 2:
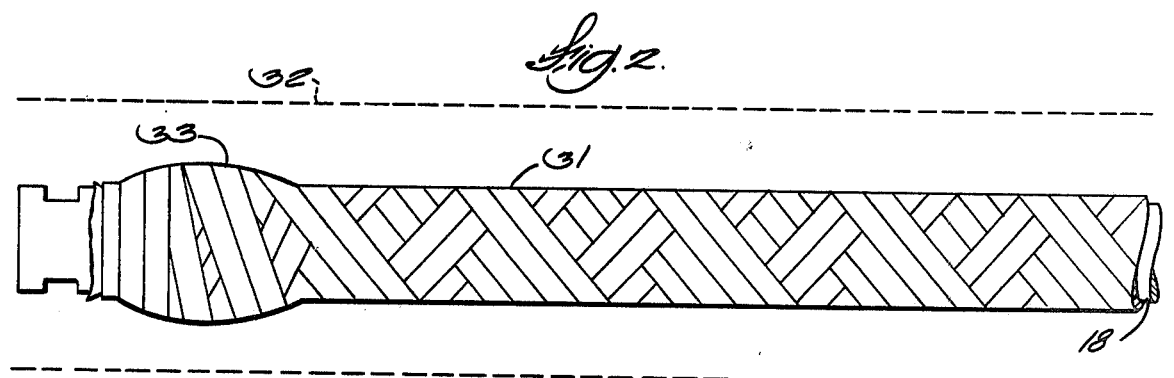
FIG. 2 shows the left portion of the completed winding on the mandrel which has been removed from the winding machine and placed in an oven designated by the broken lines.
Figure 3:
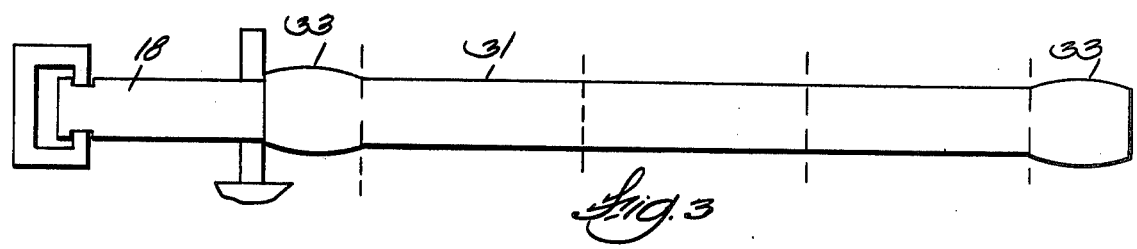
FIG. 3 shows the mandrel being removed from the rigid tube which has been formed thereon. The broken lines show where the tube is cut for removal of the ends which are discarded and to provide a number of cylinders.
Figure 8:
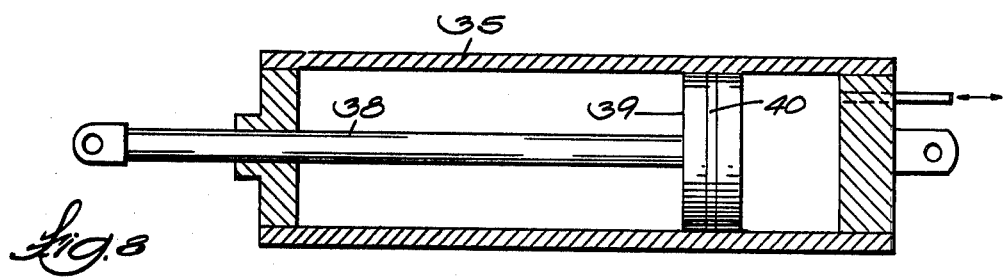
FIG. 8 shows a completed cylinder with piston and piston rod. The piston is provided with a wear and chemical resistant, elastomeric O-ring seal.

The helical pitch of the tape, as shown, is such that a single complete overlay of sleeve 21 is completed with six passes. This winding is then continued and when a suitable thickness, such as one quarter of an inch (64 mm) is completed, the assembly, partially shown in FIG. 2, is placed in an oven represented by the broken lines 32. The accelerators mixed with resin 30 provide a curing time of four hours at 380° F. (195° C.), this temperature being below whatever would damage the warp or filling of sleeve 21. After curing, mandrel 18 is withdrawn from the rigid, tubular structure 31 as shown in FIG. 3, the end knobs 33 are cut off and discarded and the intermediate portion is cut to what will be the desired lengths of the cylinders. The outer surface of each such length is then machined or ground to a smooth circular form and the ends are prepared for fixing between or to the head and base of the gas operated linear actuator. Such an actuator is shown in FIG. 8 and includes the cylinder 35, head 36, base 37, rod 38 and piston 39 having an O-ring 40 in a circumferential groove.

The grooves 42 of the present invention are illustrated in FIGS. 4 to 7 and 9. They appear in the surface of the finished cylinder 35 as it is drawn from mandrel 18. Each of the lands intermediate the grooves 42 includes the alternately arranged areas 42 and 43, namely areas 43 where filling yarn 23 overlies and presses the crimped portions of the warp yarns 22 against mandrel 20 and intermediate closed areas 44 where the resin was in contact with the mandrel. Areas 45 may include the slight machining scratches of the mandrel. These scratches are barely visible under magnification. Where a clear resin is used portions of the filling yarn 23 which is submerged in the resin can be seen below the scratches. Such portions are represented by the broken lines in FIG. 5. In the lower portion of FIG. 5 and in FIG. 7 the voids 42a are shown where they adjoin the areas 43 and are merged with the adjacent voids to form the groove.

The grooves 42 are, in fact, however, a single spiral groove (42) as will be explained further and with reference first to FIG. 9. This Figure is not drawn from anything actually observed, but is based on certain deductions. It shows only two of the filaments 22a of a warp yarn 22 and one of the apices where the yarn diverges from coating 19 of mandrel 18. The cured epoxy resin 30 is also shown in section and the void 42a (being a part of groove 42) is shown in section. The depth of void 42a is in the order of 0.005 inches (0.0013 mm) and is believed to be due to the surface tension and wetting or non-wetting character of the resin. As to coating 19, the resin 30 is non-wetting and breaks away from the coating as a non-wetting meniscus appears in a capillary tube. If the resin wets the filaments 22a, the resin 30 is believed to merge with the filaments as shown in the full line and as a wetting memiscus appears in a capillary tube; if the resin does not wet the filaments 22a, the resin breaks away from the filaments 22a as shown by the broken line. This, however, is only conjectured at this time. In any case, nonetheless, it appears that the surface tension of the resin causes the resin to form the void as shown and it is possible that the void only develops as the resin reaches a critical temperature and then becomes "set" as the resin begins to harden at that temperature. In that regard, it is noted that the mandrel is horizontal and that gravity has no observable effect whatever in the formation of the void 42a or the groove 42.

The spiral direction of the continuous void which is formed is due to the fact that the filling yarn 23 of the sleeve 21 is itself a spiral because sleeve 21 is seamless and the filling yarn 23 extends in a spiral such that the areas 43 form a spiral. However, these areas 43 are somewhat staggered from a spiral line and the groove 42 can be seen to meander for that reason as shown in FIG. 5.

The sleeve 21 is of a 1×1 or square weave and may be one of several constructions, as has been mentioned. Generally, the amount of side loading applied by the piston, the expected number of cycles and the amount of moisture present are important factors.

Teflon is the optimum material for the warp yarn filaments as to wear resistance and the Teflon also provides lubricity as is well known. None of the usual resins will wet Teflon and this is noted as to the formation of each void 42a. Two less expensive alternatives for warp yarns 22 are Nomex and Dacron. They are wetted by the resin 30. Nomex is a heat resistant nylon having the better lubricity but absorbs moisture (water) and swells such that a resin failure may occur. Dacron is a polyethylene terephthalate which does not absorb moisture but is somewhat less heat resistant and lubricious. (Nomex and Dacron are trademarks of the duPont company for the respective materials.) The warp yarns may include such as sixty (60) filaments of 400 denier. They should have a minimum of twist for the capillary action which has been described.

The filling yarn 23 may be Nomex, Dacron or cotton for example, and of a suitable filament size and number so that the yarn has a bulk significantly less than that of the warp yarns. The yarn 23 is preferably unshrunk and heat shrinkable to provide a readily controlled and convenient way to hold the warp yarns 23 against the mandrel 18, as described. However, any other equally effective method of doing so would be suitable in carrying out the present invention.

In the completed cylinder the sleeve 21 itself provides significant reinforcing of the cylinder both radially and longitudinally as well as the "sites" for the formation of the spiral groove 42. For the latter purpose, it is believed that the fabric should have in the order of 60-80 warp ends per inch and it should be woven sufficiently tight so that the warp is well crimped to provide distinct apices where the warp filaments approach the mandrel, as in FIG. 9.

I claim:

1. A fluid actuated device comprising a wound glass filament reinforced resin bodied cylinder and a piston axially movable in the cylinder by a fluid under pressure, said cylinder having an axially extending series of circumferential grooves and lands which form the inner surface thereof, said lands providing the support of the piston against radial loads and said grooves providing recesses for retaining portions of the fluid as a lubricant, said cylinder further including a fabric embedded in the resin and having relatively uncrimped circumferential filling yarns and axial warp yarns, said lands including the radially inward crimps of the warp yarns, said grooves being formed by capillary action adjacent the crimps of the warp yarns, said fabric being in the form of a seamless woven sleeve having a continuous filling yarn and in the order of 80 warp yarns per inch, said grooves and lands being of spiral form.

2. The cylinder of claim 1 wherein the resin body further includes glass filament-wound reinforcing.

3. The cylinder of claim 1 wherein helically wound glass filaments embedded in the resin body encompass the fabric.

4. A cylinder in which a piston may be disposed for axial movement by a fluid under pressure within the cylinder and having an axially extending series of voids which appear as circumferential grooves between lands which form the inner surface of the cylinder, said lands providing support of the piston against radial loads and said grooves providing recesses for retaining portions of the fluid as a lubricant, said cylinder comprising a resin body and a fabric embedded therein and having circumferential filling yarns and axial warp yarns, said lands including the radially inner crimps of the warp yarns, said grooves overlying the intersections of the warp yarns, said fabric being in the form of a seamless woven sleeve having a continuous filling yarn such that the grooves comprise a single, spiral groove.

5. The cylinder of claim 4 wherein the resin body further includes glass filament-wound reinforcing.

6. The cylinder of claim 4 wherein helically wound glass filaments embedded in the resin body encompass the fabric.

7. The method of making a glass filament reinforced resin bodied cylinder in which a piston may be disposed for axial movement by a gas under pressure within the cylinder and having an apparently axially extending series of circumferential grooves and lands which form the inner surface of the cylinder, said lands being provided for the support of the piston against radial loads and said grooves providing recesses for retaining gas-borne fluid as a lubricant for the lands, said method comprising (1) providing a seamless fabric sleeve of yarns of a 1×1 weave consisting of a continuous relatively uncrimped circumferential filling yarn and relatively larger lengthwise warp yarns of nominal twist, (2) providing a rigid, smooth cylindrical mandrel with a non-wettable outer coating, (3) circumferentially fitting said sleeve on said mandrel whereby the inner crimps of the warp yarns are pressed against and conform closely to the mandrel, (4) applying a thermosetting resin over the outer face of the sleeve and winding a series of helical glass filaments in several layers thereover such that while the resin generally soaks readily through the yarns to the face of the mandrel the surface tension of the resin causes the formation of a minute voids at the apices between the mandrel and the radially inner crimps of the warp yarns and causes the resin to form a generally spiral groove at the surface of the mandrel, (5) curing the resin while the cylinder is on the mandrel and thereafter (6) removing the cylinder from the mandrel, said groove then constituting said lubricant grooves intermediate said lands.

8. The method of making a resin-bodied cylinder in which a piston may be disposed for axial movement by a fluid under pressure within the cylinder and having an axially extending series of circumferential grooves and lands which form the inner surface of the cylinder, said lands being provided to support the piston against radial loads and said grooves providing recesses for retaining portions of the fluid as a lubricant, said method comprising providing a fabric in the form of a seamless 1×1 woven sleeve having a continuous filling yarn, fitting said sleeve on a smooth cylindrical mandrel so that the inner crimps of its warp yarns closely conform to the surface of the mandrel and the warp yarns are tightly adjacent so that their intersections form a spiral around but spaced from the mandrel, filling the fabric sleeve with a thermosetting resin while allowing the resin to form a generally spiral series of air pockets by capillary action at the surface of the mandrel, curing the resin while the cylinder is on the mandrel and thereafter removing the cylinder from the mandrel, said air pockets then constituting said grooves intermediate said lands which latter include the inner crimps of the warp yarns.

* * * * *